J. VON PETRAVIC.
SIGHTING DEVICE FOR USE ON SHIPS.
APPLICATION FILED APR. 16, 1910.
1,032,022.
Patented July 9, 1912.
5 SHEETS—SHEET 1.
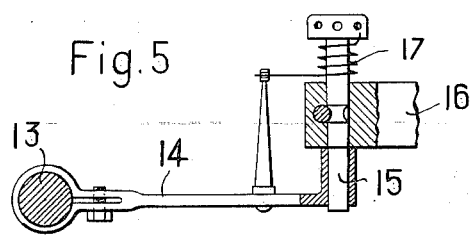
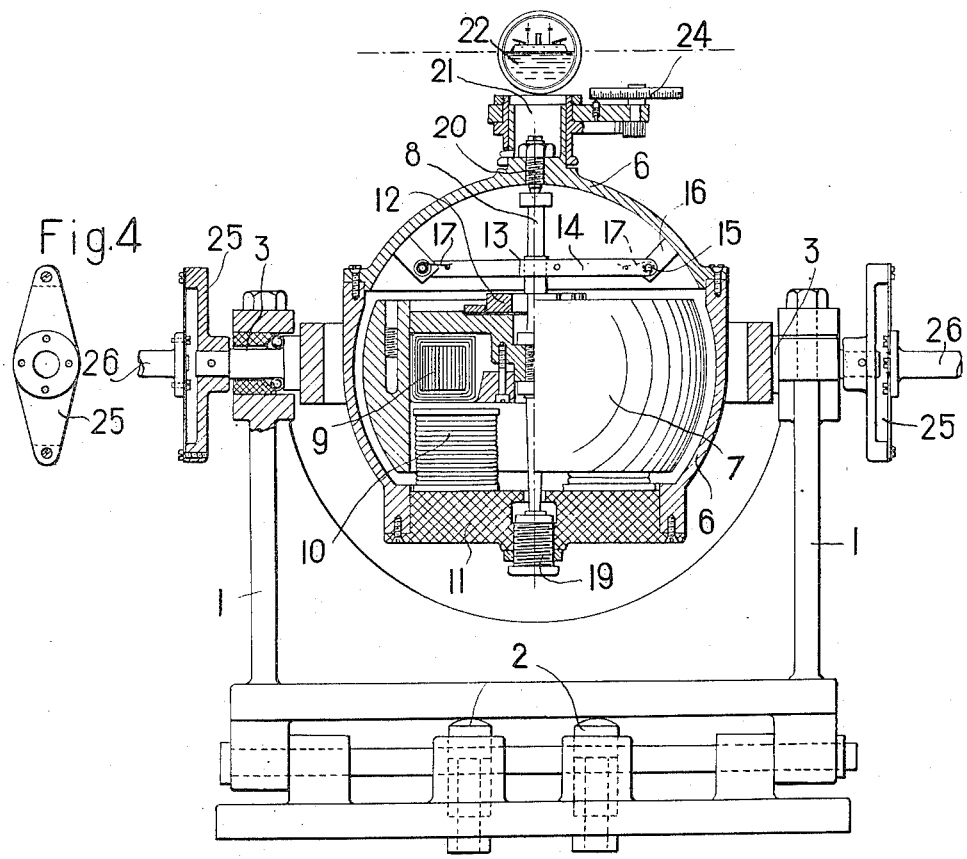

J. VON PETRAVIC.
SIGHTING DEVICE FOR USE ON SHIPS.
APPLICATION FILED APR. 16, 1910.
1,032,022.
Patented July 9, 1912.
5 SHEETS—SHEET 2.
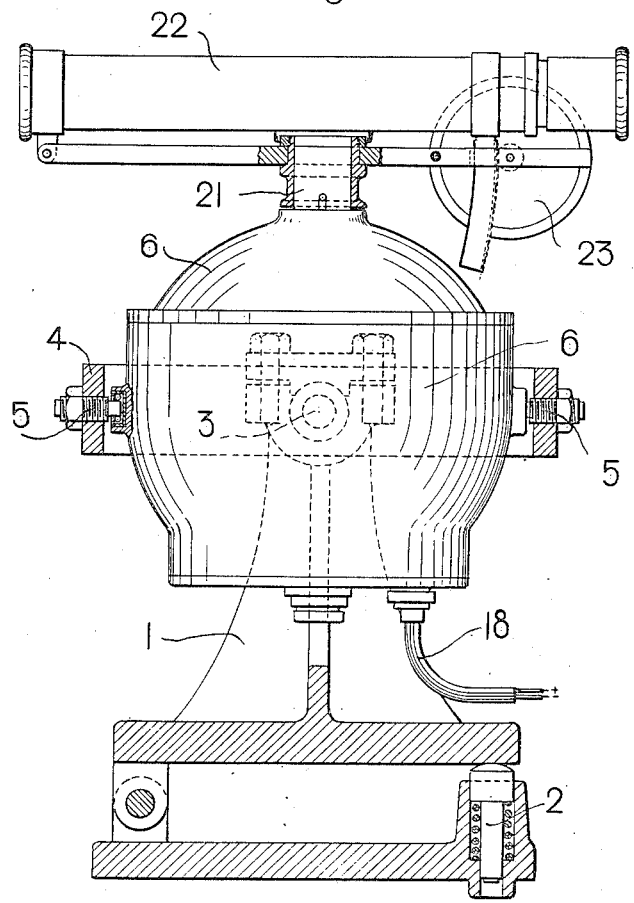

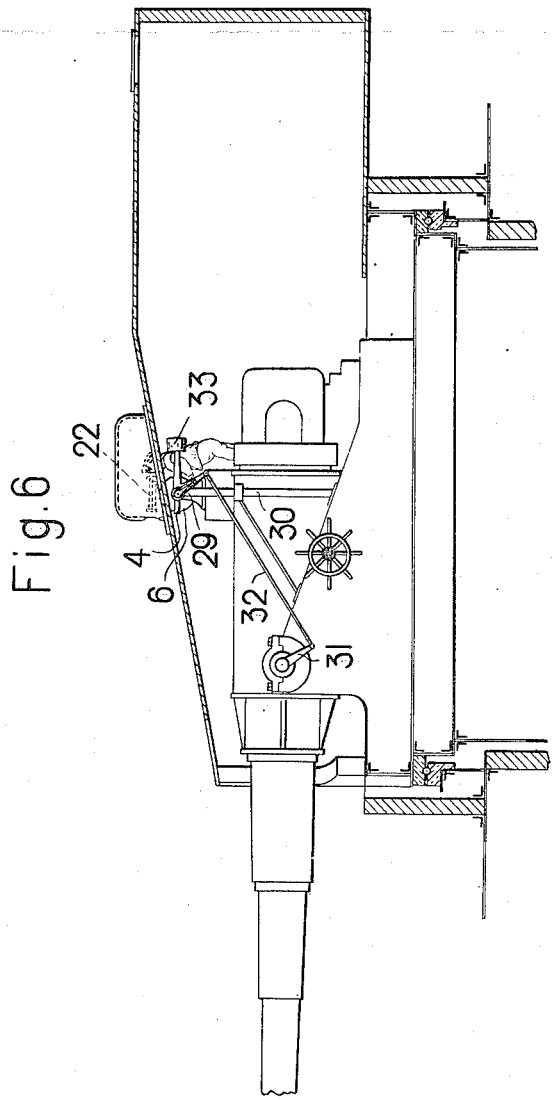

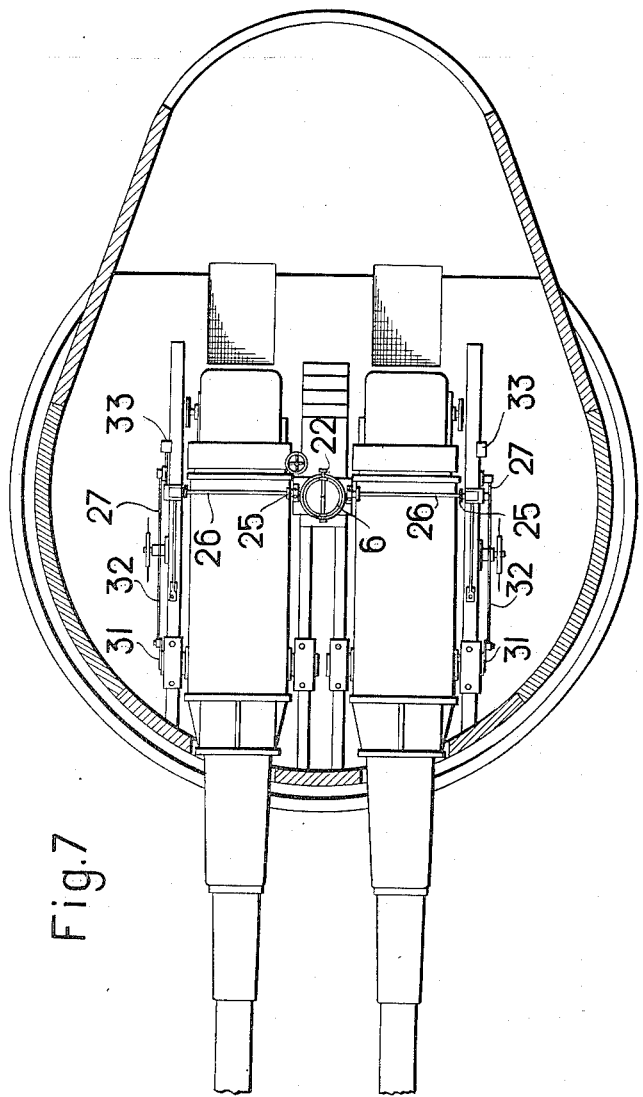

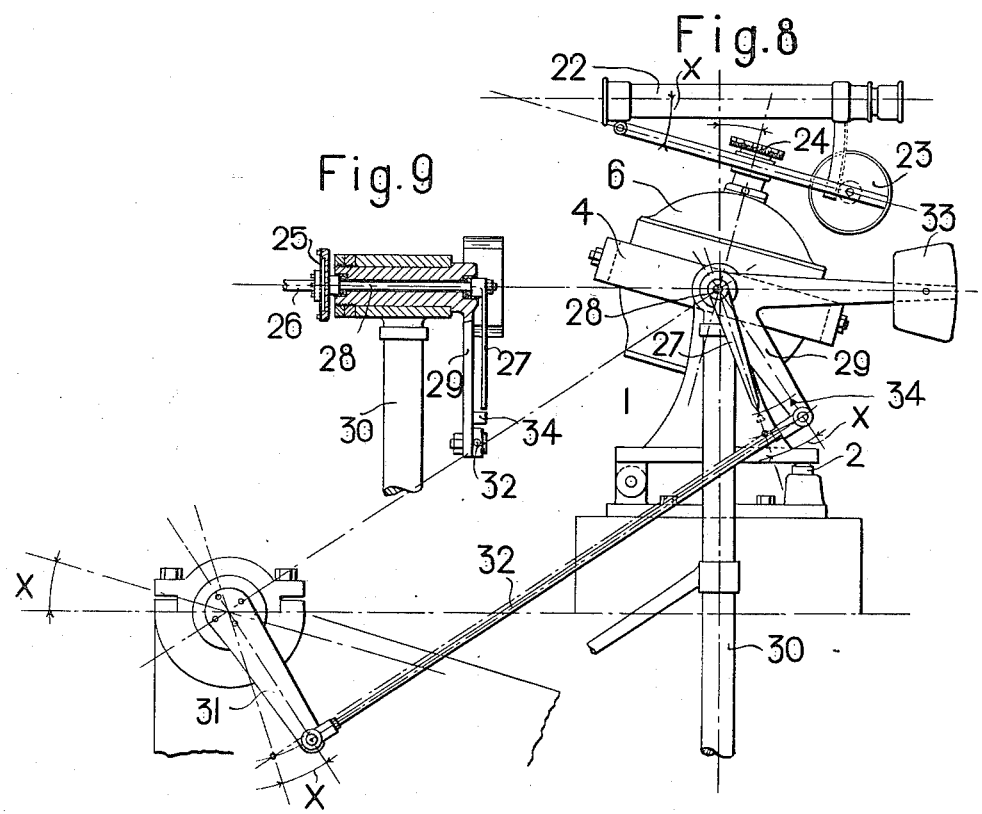

UNITED STATES PATENT OFFICE.

JULIUS von PETRAVIČ, OF VIENNA, AUSTRIA-HUNGARY.

SIGHTING DEVICE FOR USE ON SHIPS.

1,032,022.   Specification of Letters Patent.   Patented July 9, 1912.

Application filed April 16, 1910. Serial No. 555,930.

*To all whom it may concern:*

Be it known that I, JULIUS VON PETRAVIČ, a subject of the Emperor of Austria-Hungary, residing at Vienna, Austria-Hungary, have invented certain new and useful Improvements in Sighting Devices for Use on Ships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to sighting devices for use on board ship or in connection with ships' guns, and has for its object a device which enables sighting on board ship and especially in this connection the aiming and firing of ships' guns, to be effected with great accuracy, so that the sighting instruments, such as range finders, angle measuring devices, and sighting telescopes belonging to the guns or for other purposes may have their sights accurately adjusted on a distant object, and maintained unimpaired by the motion of the ship upon such object for a period sufficiently long for the particular purpose desired. This is achieved by positively connecting a sighting instrument of the above character, to one of the Cardan rings of a gyroscope suspended in stable equilibrium in such a manner, that the resulting center of gravity of the instrument and gyroscope is displaced and the latter therefore becomes a completely neutrally suspended gyroscope. Such a neutrally suspended gyroscope possesses the well known property that the axis thereof is a so called completely free axis, even in the case of alterations, which occur in the position of the gyroscope itself, and remains perfectly uninfluenced in its position in the chamber and maintains this position, so long as no force acting outside of the center of gravity of the gyroscope comes into action. When such a force is impressed, the well known effect occurs that the axis of the gyroscope exerts an absolute resistance in the direction of this force, but is deflected at right angles to this direction, as long as there is any force acting. On the other hand any subsequent forces arising and which are due to the movements of the ship, by reason of the action of the masses in changes of condition in the position of the gyroscope will not be able to produce any influence on a change of position of the axis of a neutrally suspended gyroscope, as these forces act on the center of gravity, which however lies at the point of intersection of the Cardan axis, so that, as can be easily seen, no displacement of the axis can arise owing to the fact that no torques can be originated by any of these forces. These properties of the neutral gyroscope are made use of in the present invention in that by aid of the sighting instruments an arbitrary adjusting of the axis of the gyroscope can be made by hand, care being however taken, that the hand exerts on the axis an impulse, perpendicular to the direction in which the axis is to receive a change of position. If the intended adjustment of the axis of the gyroscope and of the instrument has been effected in this manner, then the movements of the ship, as mentioned above are not able to produce any disturbances in a neutral gyroscope, therefore this adjustment will be maintained for some time at least, in so far as is permitted by certain disturbing elements which cannot be totally avoided namely the frictional resistance of the Cardan bearing pins and the action due to the rotation of the earth.

On setting the instrument upon the point to be sighted at any instant, the stability of the neutral gyroscope acts so that, this adjustment is maintained permanent for a certain time at least, in so far as the position of the line of sight to the horizontal plane is concerned. This sighting and aiming device is arranged in such a manner that the neutrality of the gyroscope can be easily produced on connecting the latter with some kind of sighting device, and that inaccuracies of the position of the center of gravity can also be remedied at any time, in order to bring the center of gravity of the whole system to the point of intersection of the Cardan axes. When this sighting and aiming device is to be employed for the sighting and firing of ships' guns, a sighting telescope provided with an elevation and side adjusting device is connected with the rigidly suspended gyroscope in such a manner, that the center of gravity of their two masses coincides with the point of intersection of the Cardan axes, which makes the gyroscope neutral. The adjustment of the telescope on the object to be sighted is transferred to an extension of the Cardan axis of the gyroscope lying perpendicular to the vertical plane through the direction of sight, and read by aid of an indicator fastened thereto. If an index be now moved concentrically to this indicator so that the former executes the same angular movement as the gun tube in its elevational movement, and if the whole arrangement be adjusted in such a manner that when the axes of the gun and of the telescope are parallel to each other at 0° adjustment, then the indicator and index also agree, therefore it is self evident, that as soon as the object to be sighted is sighted with the telescope at a determined adjusted angle, and the index is made to again agree with the indicator, the gun will have exactly the same angle to which the telescope is adjusted and can be fired with the correct aim, the firing being effected either by hand or automatically by electrical or mechanical means.

Reference will now be made to the accompanying drawings in which—

Figure 1, is a cross section of one construction of a sighting and aiming device according to the present invention, Fig. 2, is a side view. Fig. 3, is a plan view of the carrying arm of the sighting instrument. Figs. 4 and 5, are details. Figs. 6 and 7, are a side and plan view of such a device as constructed for the aiming and firing of two turret guns. Fig. 8, is a side elevation of the device itself on an enlarged scale. Fig. 9, is a section through a part of Fig. 8.

The standard 1 supporting the Cardan suspension (Figs. 1 and 2), is mounted with the buffers 2 or rigidly upon a base plate, and this plate may be rotatable in a horizontal direction. The horizontal Cardan ring by means of its axles 3 is journaled in the standard in ball bearings, in order to reduce the frictional resistance to a minimum. The vertical Cardan ring may with advantage be constructed as a casing 6 which is mounted in the horizontal ring 4 by means of pins 5 in ball bearings. The rotary member, or gyroscope 7 is journaled with its axis 8 in the casing in a like manner upon ball bearings so as to be subject to the least possible friction. Within the body of the rotary member is situated a rotor 9 of an electric motor, the stator 10 of which consisting of two field magnets, being fastened to a plate 11 forming the floor of the casing 6. The ends of the windings of the rotor are connected to the commutator 12 with which the carbon brushes 13 are in contact, the latter being fixed in the holders 14, which are rotatable about the pins 15 of the bearings 16, and are always pressed downward by means of springs 17, in order to maintain contact between the carbon brushes and the commutator. The current is supplied by means of an exceedingly pliable cable 18, Fig. 2.

The axis of rotation 8 of the rotary member 7 is journaled between adjusting screws 19 and 20 by which it is possible to adjust the center of gravity so as to lie exactly at the point of intersection of the Cardan axes, for which purpose corresponding internally screwed parts are provided in the member 6.

Upon the upper pin 21 of the casing 6 may be mounted the sighting instrument which it is intended to use. This instrument when in its place, will cause the displacement of the center of gravity of the whole Cardan suspension system with reference to the point of intersection of the Cardan axes; the necessary fine adjustment of this position of the center of gravity can be effected by means of interchangeable adjusting screws or adjusting weights provided upon the casing 6.

When it is intended to use the device an initial adjustment of the gyroscope axis is made first of all, after the gyroscope motor has been set in action, this adjustment being generally of such a nature, that the horizontal line of the cross hair lines of the sighting instrument is adjusted to lie upon the line of the horizon. When the optical axis of the telescope has been adjusted exactly perpendicular to the axis 8 of the rotary member, the latter approximates more or less to the vertical position according to the dip of the horizon. The observer effects this first adjustment by hand, and after having duly noted the position of the gyroscope axis by the aid of the telescope, imparts corresponding impulses to the gyroscope, which are only responded to by the gyroscope and the thereto rigidly connected telescope in a direction perpendicular to that of the impressed impulses. If it is the intention of the observer to displace the telescope, which is pointing at an object on the water or in the air, in such a manner that the axis of the telescope strikes the line of the horizon, which is equivalent to a change of position of the telescope in the vertical plane of observation (Fig. 2) he need in that case only exert perpendicularly to this plane, a corresponding pressure one way or the other for such a period until the intended adjustment has been effected. If it is seen after this primary adjustment that although the point of intersection of the hair lines, that is to say the optical axis of the telescope strikes the point sighted upon, yet the hair cross, itself does not occupy its upright position, then this proves that the gyroscope axis does not lie in the plane of observation. The axis of the gyroscope can however be easily brought into the latter, if an impulse be exerted which is directed at right angles to the originally exerted impulse, that is in the same direction as the plane of observation, such impulse to be exerted until the hair cross has completely righted itself. This can be tested for example by sighting upon the line of the horizon, when, if the righting process is completed the latter will perfectly coincide with the horizontal thread of the hair cross. This adjustment may be carried out with a little practice just as easily, as if the telescope were directed by the hand upon the point to be sighted, the only difference being, that at every intended alteration of the telescope, there must be exerted a rotary impulse at right angles to the direction of the desired displacement. This displacement of the telescope and of the axis of the rotary member naturally does not follow instantaneously, just as if the telescope were held loose in the hand, but positively corresponding to the energy of the rotary member and the strength of the impulse exerted, and it follows so rapidly that, changes in the inclination of the axis of the rotary member of about 5° can be made in one second.

After the second adjustment which corresponds to a fine adjustment, the sighting may be undertaken, since the axis of the rotary member will try to remain in the position given thereto for an extended period, depending upon the speed of rotation imparted to the rotary member. Quite small deflections which may occur during this time, may be easily corrected by correspondingly small impulses. Even in a ship which is rolling very badly it is possible to have the effected adjustment to be maintained with great accuracy for at least 10–20 seconds, which completely suffices for the purposes for which the device is intended. It might also be mentioned that the seeming difficulty of the observation through the telescope, caused owing to the latter being fixed in space, and therefore making movements relative to both the rolling ship and the eye of the observer, so that the eye cannot be placed against the eye-piece, do not in reality exist. For since the hair cross within the telescope lies in the plane of the image, small displacements of the eye from the optical axis, during the observation can have no influence on the accuracy of the same, moreover the relative displacements of the eye-piece to the eye take place so slowly that the eye can easily follow these movements.

Hitherto gyroscopes with arrangements for the purpose of the aiming and firing of ships' guns have been made applicable in the following way, namely that the gyroscope as a stable gyroscope was adapted to automatically assume and maintain for a time a certain adjustment, independent of the movements of the ship. Such an automatic adjustment of the axis of the gyroscope in the vertical direction can however only result, when the combined center of gravity is displaced below the point of the intersection of the Cardan axes, so that the gyroscope is a stable one. The vertical adjustment will hence be the more accurately and quickly effected the greater is the distance between these two points, that is to say the lower the combined center of gravity lies. From this it follows however that each change of the moment of inertia of the gyroscope, and for this reason also each change of the moment of inertia of the ship itself (caused by the sea, alteration of the speed of traveling, deviation from the course, turning the ship etc.) must cause a disturbing effect on the center of gravity of the gyroscope and therefore on the vertical adjustment of the same. Consequently the assumption is incorrect that a gyroscope suspended in stable equilibrium on a ship always subjected to the above mentioned changes of condition, is able to automatically adjust itself exactly vertical and to maintain this position. The distance of the center of gravity from the point of intersection of Cardan axes cannot however be reduced at will in a stable gyroscope, since the smaller this distance is, the longer will be the period required for the vertical adjustment of the gyroscope, even if no disturbing influences are at work. Therefore, this distance cannot be reduced below a certain degree and practically it must be of such dimensions that the deviations or deflections of the axis of the gyroscope arising through the disturbing actions will amount to one minute of arc and will frequently be larger. Consequently a stable gyroscope is of no practical value on ships for the purposes which the present invention endeavors to attain, and for which a degree of accuracy of at least 1 to 2 minutes of arc is required.

According to this invention quite a new foundation for the correct mode of operation of the whole arrangement is produced, in that a stable gyroscope is connected with a sighting instrument in such a manner that the combined center of gravity coincides with the point of intersection of the Cardan axes, whereby the gyroscope becomes neutral. The adjustment is not effected automatically by the gyroscope but by the hand of the observer and the gyroscope itself has only the task of maintaining this adjustment.

Owing to the application of a gyroscope which has been made neutral the following advantages are produced.

(1.) Even in the most unsteady ship the accurate adjustment of the gyroscope can be very rapidly effected, maintained constant, and corrected. The device can moreover be set into action in a few minutes.

(2.) Alterations in the moment of inertia can exert no disturbing influences.

(3.) In so far as the application of the device deals with the aiming and firing of ships' guns, the advantage is produced, that owing to the sighting on the object, the gun appears to be trained at the same time in the angle of position, if as may be considered the gun and telescope are at approximately the same height, moreover even the deflections from this angle arising owing to the sea way can be corrected.

If the device is applied as an aiming and firing device for ships' guns, then it is preferably constructed as is shown in Figs. 6-9. The sighting telescope 22 mounted on the gyroscope is provided with members 23 and 24 for effecting the adjustment in altitude and azimuth. The gyroscope itself is resiliently fitted on a base plate in the center of the turret (Figs. 6 and 7). The Cardan axles 3 are connected by means of elastic couplings 25 (Figs. 1, 4 and 9) and intermediate shafts 26 (Figs. 1 and 7) with the shaft members 28 each of which carries an indicator 27, so that every rotation of the Cardan axis 3 and therefore every rotation of the telescope in the vertical plane of observation is accurately transferred to these indicators. The shaft members 28 are journaled in the center of the hub of the lever 29, by means of ball bearings, in order to reduce the friction to a minimum, the said lever resting in the eye bearings provided in the standard 30. Levers 31 are fixed on the front faces of the trunnions of the two guns, the levers 29 and 31 being of the same length and perpendicular to the line connecting the center of the trunnions and the center of the eye bearings of the standard 30. Every rotation of the barrel of the gun is transferred from the lever 31, with exactly the same angle to the lever 29 by means of the connecting rod 32. Each of the levers 29 is constructed as an elbow lever and carries at its free end a weight 33 which constantly presses the lever 29 against the rod 32 and the latter against the lever 31, the lever 29 as well as the lever 31 at the point of connection of the connecting rod 32 having a certain but limited amount of play in the eye bearings of the latter, and by this weight 33 disadvantageous effects are remedied, which could occur if this free play should come into action. When the telescope is directed with its optical axis exactly horizontal with an adjustment of 0° elevation, the barrel of the gun will be the same, if the indicator 27 will exactly agree with an index 34 on the lever 29.

With the above assumption, in using the device, the sighting telescope is adjusted first of all on the line of the horizon as has been described and the hair cross is adjusted horizontally. The axis of the gyroscope will now be in the vertical plane of observation, to which the axes of the guns are parallel. The adjustment of the guns in the horizontal direction is effected by turning the turret by the aid of the usual devices, in order to bring the guns into a position parallel to the vertical plane of the object aimed at, or by the previous adjustment of the necessary side correction on the telescope by means of the arrangement 24 with the consequent side displacement produced hereby. The device forming the object of the present invention will already be of advantage owing to the attainment of this side direction, since sighting with the telescope connected to the gyroscope which has been set in action will be essentially easier than with the usual aiming telescope, which is subjected to the rocking of the ship and which for the latter reason must possess a large field of view, and can therefore have only small enlarging power. If after prior adjustment of the device 23 the telescope is sighted on the object with the elevation angle $x$ which is to be given to the guns, the guns are elevated by means of their elevating mechanism until the index 34 agrees exactly with the indicator 27, then the guns in this position must have exactly the elevation $x$ to which the telescope is adjusted. Consequently it can easily be seen that when the ship is rolling heavily in a sea way and in the course of one of these motions the guns attain or pass the elevation $x$, then at the same instant the index 34 will agree with the indicator 27. In this case the elevating mechanism for the gun need not be used at all, but after the telescope has been adjusted on the target it is only necessary to wait until in the course of the motion of the ship the indicator 27 agrees with the index 34, at which moment the gun must be fired. It may further be noted that as the motion of the ship and the elevating mechanism tend toward the same object consequently they may both be applied together.

Since the points of the indicators, so to speak, represent the object on which the guns have to be trained, and which is completely unaffected by the rocking of the ship, therefore the probability of hitting the target, in so far as it deals with the correct elevation adjustment of the guns on strongly rocking ships, will be considerably greater with this arrangement than has been the case with those proposed or used hitherto. The accuracy of firing may be still further increased in that upon the indicator and index being in agreement the guns are fired automatically by electricity, care being taken hereby against a corresponding preignition.

I claim—

In combination, a sighting telescope and a gyroscope carrying the same, the two being in neutral equilibrium, an index carried by an extension of the transverse axis of the gyroscope, a gun having a lever on one of its trunnions, a bell crank lever mounted concentric to the axis of rotation of the index having one of its arms parallel to the lever on the trunnion and carrying an index coöperating with the first index, and a link connecting said arm and lever to maintain them parallel under all conditions of operation.

In testimony that I claim the foregoing as my invention, I have signed my name in presence of two subscribing witnesses.

JULIUS von PETRAVIČ.

Witnesses:
HENRY HASPER,
WOLDEMAR HAUPT.